(12) United States Patent
Barbosa (10) Patent No.: US 7,831,050 B2
(45) Date of Patent: Nov. 9, 2010

(54) FAST MULTI-PHOTON KEY DISTRIBUTION SCHEME SECURED BY QUANTUM NOISE

(76) Inventor: Geraldo Alexandre Barbosa, 1351 Tilton Dr., Franklin, TN (US) 37067-8540

( * ) Notice: Subject to any disclaimer, the term of this patent is extended or adjusted under 35 U.S.C. 154(b) by 1213 days.

(21) Appl. No.: 11/000,662

(22) Filed: Dec. 1, 2004

(65) Prior Publication Data

US 2005/0152540 A1     Jul. 14, 2005

Related U.S. Application Data

(60) Provisional application No. 60/527,067, filed on Dec. 4, 2003.

(51) Int. Cl.
*H04L 9/08* (2006.01)
(52) U.S. Cl. .................... 380/278; 380/28; 380/256
(58) Field of Classification Search .............. 380/28, 380/256, 263, 278
See application file for complete search history.

(56) References Cited

U.S. PATENT DOCUMENTS

| | | | | |
|---|---|---|---|---|
| 5,515,438 | A * | 5/1996 | Bennett et al. | 380/278 |
| 5,732,402 | A * | 3/1998 | Lehman | 707/205 |
| 6,895,092 | B2 * | 5/2005 | Tomita | 380/278 |
| 7,305,084 | B2 * | 12/2007 | Hawkes et al. | 380/37 |
| 7,305,091 | B1 * | 12/2007 | Hirano | 380/255 |
| 7,403,623 | B2 * | 7/2008 | Cerf et al. | 380/278 |
| 7,620,182 | B2 * | 11/2009 | Berzanskis et al. | 380/256 |
| 2004/0032954 | A1 * | 2/2004 | Bonfrate et al. | 380/263 |
| 2004/0109564 | A1 * | 6/2004 | Cerf et al. | 380/256 |

OTHER PUBLICATIONS

Jennewein et al., "A fast & compact quantum random number generator", Apr. 2000, Review of Seicentific vol. 71, No. 4, copyrights 2000 American Institue of Physics.*

Aspelmeyer, Markus et al., "Long-Distance Quantum Communication with Entangled Photons using Satellites," quant-ph/0305105 v1, May 19, 2003.

Barbosa, Geraldo, "Fast and secure key distibution using mesoscopic coherent states of light," Phys. Rev. A 68, 052307 (2003).

Barbosa, Geraldo, "Fast and secure key distibution using mesoscopic coherent states of light," arXiv:quant-ph/0212033 v1 Dec. 5, 2002.

* cited by examiner

*Primary Examiner*—Kimyen Vu
*Assistant Examiner*—April Y Shan
(74) *Attorney, Agent, or Firm*—McAndrews, Held & Malloy, Ltd.

(57) ABSTRACT

A key distribution scheme comprising a generation and reception system and a specific operation protocol is described. This system allows fast and secure key distribution in optical channels by two stations A and B. One or two true-random physical sources are used to generate random bits and a random sequence received provides the cipher to the following one to be sent. A starting shared secret key is used and the method can be described as a one-time-pad unlimited extender. The minimum probability of error in signal determination by an eavesdropper can be set arbitrarily close to the pure guessing level of one-half and the security of the method comes from the quantum noise of light as well as from the starting secret key. This system allows for optical amplification without security degradation within its operational boundaries.

19 Claims, 6 Drawing Sheets

FAST MULTI-PHOTON KEY DISTRIBUTION SCHEME SECURED BY QUANTUM NOISE

CROSS-REFERENCE TO RELATED APPLICATIONS

The present application claims the priority of provisional patent application Ser. No. 60/527,067 filed Dec. 4, 2003. That application is hereby incorporated herein by reference.

REGARDING FEDERALLY SPONSORED RESEARCH OR DEVELOPMENT

This work was supported in part by Air Force Research Laboratory—Grant NO. F30602-01-2-0528 (Northwestern University, PI: H. P. Yuen).

FIELD OF THE INVENTION

This invention relates to secure communications via optical channels where the security level is given by the quantum noise inherent to light fields and the protection level does not rely on intrusion detection mechanisms. In particular, it applies to a secure distribution of random keys for cryptographic use.

BACKGROUND OF THE INVENTION

By sharing a sequence of random bits, two users obtain with provable security the capacity to transmit messages that cannot be deciphered by an eavesdropper (one-time-pad protocol) as well as to distinguish legitimate messages from forged or altered ones (authentication procedures). Creation of fresh key information and the means to securely transmit them is a central goal in cryptography. Set aside security aspects, speed is another requirement of modern communication systems that excludes use of couriers to transport fresh keys. Communication systems only secured by mathematical complexities rests on unproven assumptions such as the difficulty of factoring large numbers and may vulnerable either by advances in computational power or new mathematical insights. Physical cryptography, on the other hand, can create schemes providing two users, at distinct locations, with on-demand copies of a secure sequence of random bits of arbitrary length and at fast rates without relying on mathematical complexities. These schemes could be of high value for commercial systems operating over long distances. Communication with perfect secrecy using the securely transmitted keys could be guaranteed over an insecure channel in Vernam's sense of a one-time-pad. Technology advances, therefore, such as enhanced computational power, should not affect the security of these schemes.

The BB84 quantum protocol for key distribution and the paradigm among protocols using single photons, has been used in short distance applications but not in long distance networks. See for example, C. H. Bennett and G. Brassard, "Quantum cryptography: public-key distribution and coin tossing", Proc. IEEE International Conference on Computers, Systems and Signal Processing, Bangalore, India, pp. 175-179, 1984; and N. Gisin, G. Ribordy, W. Tittel, and H. Zbinden, Rev. Mod. Phys. 74 pp. 145-195 (2002). R. J. Hughes, J. E. Nordholt, G. L. Morgan and C. G. Peterson, QELS Conference, OSA Technical Digest, Vol. 74, p. 266 (2002). One fundamental reason is that the same no-cloning theorem that guarantees its security level prohibits the signal amplification necessary in long-haul communication links. No practical alternative quantum scheme using quantum repeaters or entangled states has yet been proposed although theoretical studies exist. Other practical impediments are the slow speed of the photon sources and the large recovery time of single photon detectors. The speed difficulties and the impossibility of amplification rule out the single photon protocols to be used in long haul commercial communication lines. However, one has to assume that key distribution systems could be obtained in a secure way within a few years through BB84 key distribution systems by using satellites. See for example, M. Aspelmeyer, T. Jennewein, and A. Zeilinger, M. Pfennigbauer and W. Leeb, quant-ph/0305105 v1, 19 May 2003. The expected rates of this quantum key distribution process are expected to be low and, therefore, a scheme for fast and secure key distribution that could use a starting shared secret key obtained by this or another slow secure method is expected to be of great utility for applications demanding overall speed and security. The cryptographic system object of this patent application is direct to this use.

"Quantum key distribution (QKD) using non-orthogonal macroscopic signals," U.S. Pat. No. 5,515,438, uses non-orthogonal quantum states to distribute random information, suitable for use as a key for encryption and authentication, between two users who share secret information initially. It differs from previous QKD schemes in using macroscopic signals instead of single photons. This system is bound to two bases states to encrypt-decrypt the desired information. The limitation of two bases gives brute force attacks on the key a high probability of success even for coherent light states with mesoscopic number of photons. The quantum noise of light in this case would cover at most the two bases in the system and its protection relies mostly on the secret key used and the associated mathematical complexity. A system with protection mostly derived from the quantum noise of light is preferable.

A ciphering scheme utilizing an M-ry bases system that was implemented for data encryption has been proposed. See for example, H. P. Yuen, in "Ultra-secure and Ultra-efficient Quantum Cryptographic Schemes for Optical System, Networks and the Internet", unpublished, DARPA/Northwestern University Project (2000); G. A. Barbosa, E. Corndorf, and P. Kumar, "Quantum Cryptography with Coherent-state Light: Demonstration of a Secure Data Encryption Scheme Operating at 100 kb/s"; Quantum Electronics and Laser Science Conference, OSA Technical Digest 74, pp. 189-190 (2002); G. A. Barbosa, E. Corndorf, P. Kumar, and H. P. Yuen, Phys. Rev. Lett. 90, 227901 (2003); and also in quant-ph/0212018 v2 21 Apr. 2003; G. A. Barbosa E. Corndorf, P. Kumar, H. P. Yuen, G. M. D'Ariano, M. G. A. Paris, and P. Perinotti, "Secure Communication using Coherent States", in The Sixth Int. Conference on Quantum Communication, Measurement and Computing, July 2002 (Rinton Press, Princeton, April 2003), pp. 357-360; and E. Corndorf, G. A. Barbosa, C. Liang, H. P. Yuen, and P. Kumar, "High-speed data encryption over 25 km of fiber by two-mode coherent-state quantum cryptograph", Optics Letters 28, 2040-2042 (2003). Basically, in these cryptographic prototypes, the quantum noise inherent to coherent states forces different measurement results for the eavesdropper and the legitimate users that use a shared key in their measurements. This noise will increase the observational uncertainty preponderantly for the eavesdropper, hereafter named Eve (E), rather than Alice (A) and Bob (B), hereafter named legitimate users. Although this noise is irreducible by nature to all observers, the knowledge of a key allows A and B to achieve a much higher resolution than the one obtained by Eve. The very simple idea behind this is that, for each bit, the noise is distributed without control among the output ports in Eve's measurement apparatus while A and B use the key to select a single output port where the noise does not practically affect bit readings. For other known systems see, "Fast and secure key distribution using mesoscopic coherent states of light", G. A. Barbosa, Phys. Rev. A 68, 052307 (2003); arXiv:quant-ph/0212033 (2002).

BRIEF SUMMARY OF THE INVENTION

The key distribution system of the present invention utilizes an M-ry bases scheme but in different way than it has been used in the past. The system of the present invention distributes random bits that come from a physical random source(s) and a specific protocol is applied to provide security. The use of true physical random sources is a characteristic of this key distribution system as well as the block ciphering utilized together with the correct balance of light intensity and bases states utilized to achieve security as will be describe din this patent application. The name "key distribution" is used here to denote a process where one party sends to the other random bits created by a truly random physical mechanism. The exchange of random bits between A and B is done in such a way that the quantum noise of the light, together with the use of a secret key, does not allow E to obtain the final random sequence shared by A and B. In contrast, a classical key expansion method could mean a process to generate mathematically (e.g., by one-way functions) two identical sets of random bits, one for each user, from a set of shared starting bits. Stream-ciphers, for example, generate a stream of pseudo-random bits from a starting key. However, this deterministic process produces correlations that can be detected by the eavesdropper. Known-plaintext attacks are particularly useful to exploit these correlations in classical cryptography. All applications originally proposed by prior systems utilize stream ciphers while the system of the present invention only utilizes physical random generators (PhRG) to create random bits and, therefore, to eliminate altogether correlation attacks as the ones that may be exploited when stream ciphers are used.

More particularly, the system of the present invention allows fast and secure key distribution in optical channels by two parties A and B. One or two true-random physical sources are used to generate random bits and a random sequence received provides the cipher to the following one to be sent. A starting shared secret key is used and the method can be described as a one-time-pad unlimited extender. The minimum probability of error in signal determination by the eavesdropper can be set arbitrarily close to the pure guessing level of ½ and the security of the method comes from the quantum noise of light as well as from the starting secret key. This system allows for optical amplification without security degradation within its operational boundaries. The achievable distance within the optical channel is limited by the signal-to-noise ratio at the detection system of the legitimate receiver.

In accordance with a feature of the present invention, the cryptographic optical system uses the quantum noise of light allowing two parties A and B to securely share unlimited sequences of random bits over an optical channel transmitting mesoscopic intense signals by using one or more physical random generators and starting from a shared secret key between each pair of users and where a random sequence received establishes the cipher for the next bit sent. The security of this system is established within the range where the legitimate receiver has a good signal-to-noise ratio. These secure signals can be optically amplified within the defined range of the system's operation. The security provided by the system and the associated protocol comes from the quantum noise of light as well as from the starting secret key. A brute force key search by Grover's search algorithm leads to a exponential search $e^{x/2}$ where the exponent x is proportional to the length of the starting shared secret key and, therefore, can be made computationally unfeasible for a reasonable seed key size. A protocol controls the necessary steps in this key distribution and includes, besides standard procedures, specific commands to cover with quantum noise short range correlations between cipher and signal. The security provided by the system and the associated protocol comes from the quantum noise of light in the quantum channel as well as from the starting secret key.

In accordance with another feature of the present invention, a random bit generator source consists of a shot-noise limited coherent light source followed by a light-shot-limited fast detector providing final binary voltage signals corresponding to the algebraic sign (+ or −) of the signal with respect to the average number of photons emitted by the light source during time intervals of the order of the bit duration. These random binary voltage signals constitute the random bits from the physical random generator.

DETAILED DESCRIPTION OF THE INVENTION

The key distribution system of the present invention provides security protection even if an eavesdropper is allowed to have full access to the random signal sequence being generated and samples all signals near the source, such that energy loss does not affect the data. The protection of the scheme does not rely on intrusion detection mechanisms but instead on the measurement advantage enjoyed by stations A and B, knowing the key, over the eavesdropper.

Figure 1:
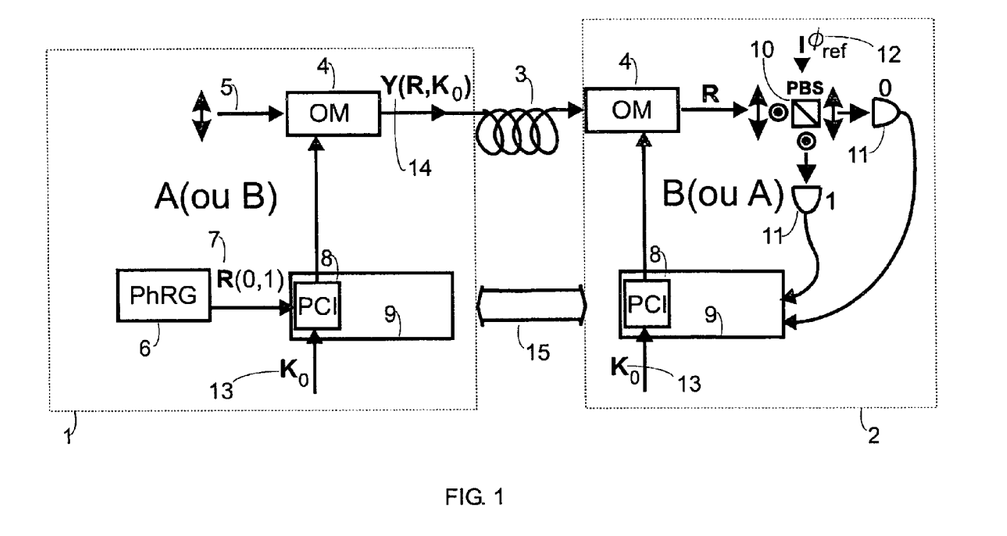
FIG. 1 is a block diagram illustrating a basic scheme for key distribution with polarized light.
Figure 2:
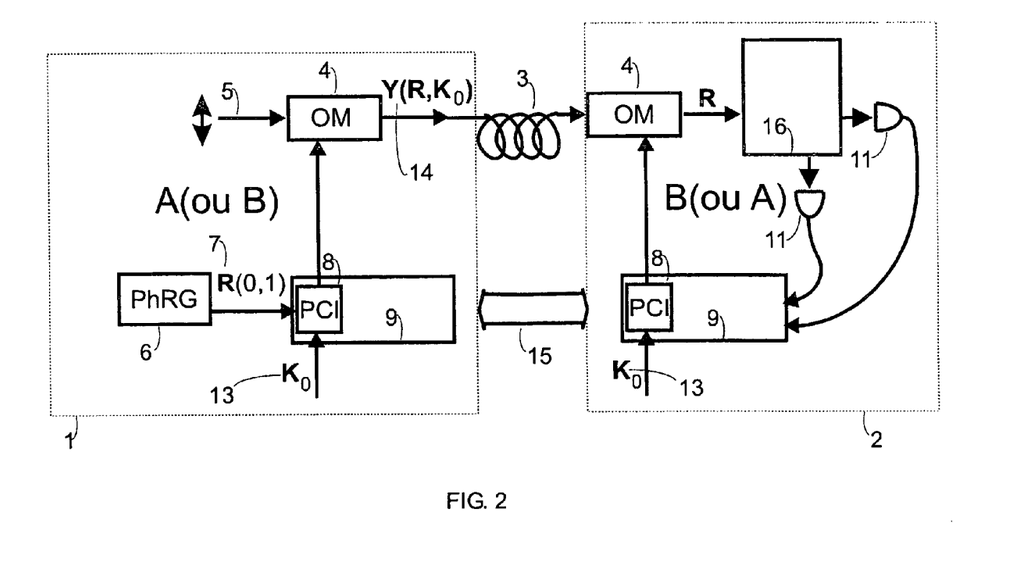
FIG. 2 is a block diagram illustrating a basic scheme for key distribution with phase modulated light.

The basic physical resources for the key distribution system of the present invention are illustrated in FIG. 1 for polarization modulation and in FIG. 2 for phase modulation. As shown in FIG. 1, an emitter station 1 is in secure communication with a receiver station 2 via an optical channel 3 that can be an optical fiber, free space or other communication channel. A laser beam 5 provides an input to an optical modulation (OM) 4 where the OM 4 actuates on the mesoscopic state describing the laser beam 5, i.e. the mesoscopic light output from the source 5. A physical random generator (PhRG) 6 produces a sequence of random bits R(0, 1) 7. A PC 9 controls an interface card (PCI) 8 where the PCI 8 generates M voltage levels with M being fixed or variable. The PC controlled interface card 8 in the emitter station provides an input to the optical modulator 4 in response to the sequence of random bits 7 from the physical random generator 6 and in response to a starting running key $K_o$ 13. The output from the optical modulator Y(R, $K_o$) is the ciphered R, i.e. the ciphered sequence of random bits. In the receiver station 2, a polarization beam splitter PBS 10 followed by two detectors 11 constitute the detection system for polarized signals. An optional phase reference $\phi_{ref}$ 12 allows distinction of antipodal signals, e.g., right or left circularly polarized light signals. A public channel 15 allows classical communication between the two stations A and B. FIG. 2 illustrating the basic system for key distribution with phase modulated light is similar to FIG. 1 except that the PBS 10 of FIG. 1 is replaced by a phase detection system 16 in FIG. 2. The phase detection system may contain standard interference optical setups such as Michelson and Mach-Zehnder interferometers. These interferometers can include optical circulators and static or dynamic phase stabilizers including Faraday rotation to compensate for fiber induced polarization fluctuations in the interferometer arms.

In FIGS. 1 and 2, two stations A and B can operate as either the emitter 1 or the receiver 2 that communicate via the optical channel 3 and public channel 15. Similarly, stations A and B can each have an emitter unit 1 and receiver unit 2. This cryptographic system can be equally implemented uni-directionally or bi-directionally.

The Protocol

The protocol steps are written in italics and followed by descriptions of preferred embodiments for each step.

1. *Stations A and B share an initial secret random sequence (of length $L_0$) of bits $K_0$.* How A and B will share this initial sequence is, of course, an important matter. Although current cryptography can provide enough security for sharing the short sequence $K_0$ at this moment, it may be vulnerable to the evolution of computational power. $K_0$ could be obtained in a secure way within a few years through the slow but proved secure BB84 key distribution system. The use of satellites to distribute quantum keys have been under study and developments in this direction can be expected to produce fruits in a near future. See for example, M. Aspelmeyer, T. Jennewein, and A. Zeilinger, M. Pfennigbauer and W. Leeb, quant-ph/0305105 v1, 19 May 2003. Unless proved otherwise, the expected rates of this quantum key distribution will be low. However, the key distribution system described herein creates a fast distribution rate once a short sequence $K_0$ have been obtained—even through a slow process. Once $K_0$ is utilized it can be destroyed.

Figure 3:
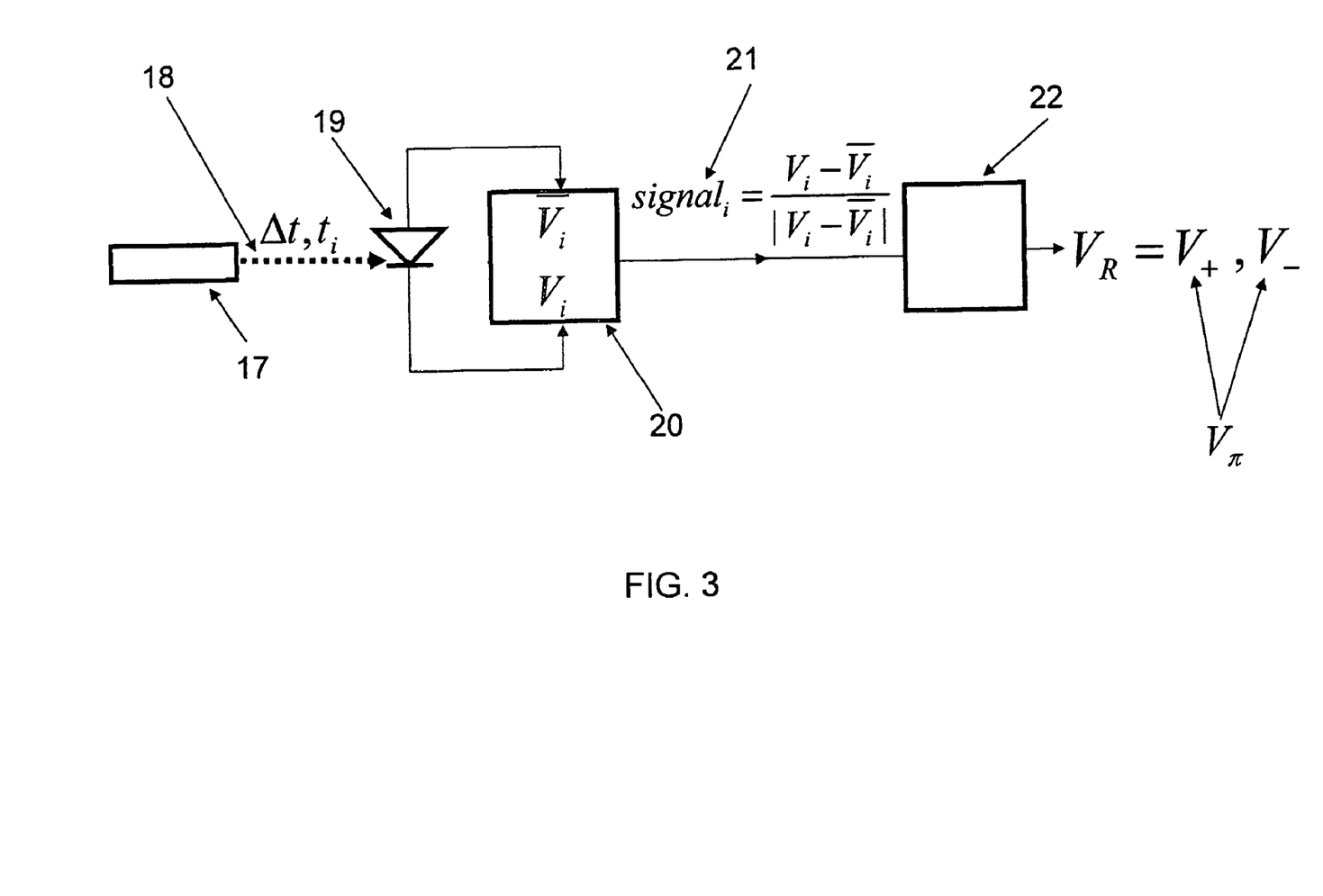
FIG. 3 is a block diagram illustrating a physical random generator or random bit source.

2. *Station A generates a sequence (of length $L_0$) of true random bits R.* This sequence of bits R can be obtained from the binary output of the physical random generator (PHRG) 6 shown in FIG. 3 as voltages $V_R=V_+$ or $V_-$ that are going to be associated with bits 0 and 1. In a preferable embodiment of such random generator 6, a shot limited laser 17 provides a pulsed light beam 18 within a short time window $\Delta t_i$, around $t_i$ to a shot-noise limited optical detector 19 to supply voltage outputs $V_i$ (i=1, 2, ... ). The sign 21 of these pulses, $sign_i=(V_i-\overline{V}_i)/(|V_i-\overline{V}_i|)$, where $\overline{V}_i$ is the average pulse voltage after many emissions, will feed a binary voltage source 22 to provide the random bit sequence R.

3. *A sends to B the random sequence R ($=R_1$) of length $L_0$ in blocks of size $K_M$. Ciphering each of these blocks uses $K_M$ bits from $K_0$.* The number of blocks to be ciphered in $L_0$ is $L_0/K_M$. A coherent state carrier is used with intensity <n>/bit. In order to generate each cipher basis k(=0, 1, ... M-1), $K_M$ (=$\log_2 M$) bits are used from the random sequence of bits $K_0$(e.g, k=b($K_M$)$2^{K_{M-1}}$+b($K_{M-1}$)$2^{K_{M-2}}$+ ... b($K_1$)$2^0$). In other words, each k basis of the M=$2^{K_M}$ set will be randomly defined by $K_M$ bits taken from $K_0$. Each k will be used to cipher a block sequence of size $K_M$ from $R_1$. Ciphering $R_1$ in blocks of size $K_M$ keeps the length of the transmitted bits constant and equal to $L_0$.

The signals provided by the PhRG 6 and by the running key ($K_0$ at the beginning) 13 define voltage levels to be applied by the PCI 8 to the optical modulator OM 4. Each voltage $V_k$ generated is associated with a specific basis of the M-ry scheme. The pulsed mesoscopic coherent state at the input (see FIG. 1) can be seen as a linearly polarized light beam 5. Orthogonal polarizations define bits 0 or 1. The input pulse is modified by the action of the OM 4 into a state (e.g., elliptically polarized light) Y(R,$K_0$) 14 that is sent to station B. Without the modulation given by $V_k$ the output signal would show the sequence R of orthogonally linearly polarized states (bits 0 and 1) on a single basis. The $V_k$ modulation converts these signals to a non-orthogonal set of M-ry states. A similar line of reasoning applies to phase modulated signals, where phases 0 and π provide the two bits. The precise state to be used is a matter of choice and may involve, in general, even more than the two states here described as a preferred embodiment due to the simplicity. Extension to other kinds of standard modulation is straightforward, such a Differential Phase-Shift-Keying (DPSK) where changes in two consecutive states define the bit.

4. *By knowing the sequence of bits $K_0$, station B demodulates the received sequence obtaining $R_1$.* At the receiving station, by applying the shared key $K_0$ 13, station B demodulates the changes introduced by A and reads the resulting true random stream $R_1$ of orthogonally polarized light states. Stations A and B now share a fresh sequence of random bits $R_1$.

5. *Station B obtains a fresh random sequence $R_2$ from its PhRG 6 and sends it to station A, ciphering the sequence in blocks of size $K_M$. Ciphering bits are taken from the earlier sequence received $R_1$. Each sequence of bits, of length $K_M$, from $R_1$ define the ciphering basis for $K_M$ fresh bits in $R_2$.* By knowing $R_1$, A reads $R_2$ with perfection. The first cycle is complete.

6. *Stations A and B continue to exchange random sequences as described in the first cycle.* Subsequent cycles can be performed and in each cycle, blocks of size $K_M$ are ciphered to keep the total length in each cycle constant and equal to $L_0$. Stations A and B can then share an unlimited sequence of random bits obtained from the PhRGs 6. A shared random sequence can be used to re-start a cycle by stations A or B whenever an interruption occurs.

7. *Stations A and B apply information reconciliation and privacy amplification to distill a final sequence of bits.* The described protocol is set under ideal conditions where losses do not disturb appreciably the channel or the signal detection. This sets $L_0$ as a constant throughout the whole process. In practice losses occur and, if not possible to be corrected, the length $L_0$ have to renormalized and eventually the process may end after a certain number of cycles where a new starting key have to be introduced. A reduction of $\eta(\leq 1)$ in the length $L_0$ will produce after n rounds an amount $$L_0 \eta \frac{(\eta^n - 1)}{\eta - 1}$$

of shared keys. Values of $\eta \sim 1$ produce a large number of shared keys to A and B before a new starting key have to be used.

Not just physical losses may occur but also information losses to E as indicated by the Mutual Information measure I(R;Y$_E$)=H(R)−H(R|Y$_E$) that should be calculated for a random sequence R. Y$_E$ designate the signals obtained by E in the noisy channel. E can obtain correct bits even by pure chance. This is a standard straightforward calculation whose results will indicate the number of bits to be discarded by privacy amplification to reduce the amount of information eventually known to E to negligible levels. The process of privacy amplification (See for example, "Generalized Privacy Amplification", C. H. Bennett, G. Brassard, C. Crepeau, and U. M. Maurer, 1994 IEEE International Simposium on Information Theory, June 27-July 1, Trondheim, Norway, 1994; C. Cachin, U. M. Maurer, Journal of Cryptology 10, 97-110 SPR (1997), and references therein) discards bits in the sequence and destroys the short-ranged bit-cipher correlations due to the block ciphering as well. As the signals from PhRGs present no bit correlation due to the true random physical process, the final shared random sequence will present a statistical property of true random bits. Privacy amplification and bit reconciliation utilize the public channel 15 (See FIGS. 1 and 2).

This protocol for the key distribution scheme can be similarly developed for a one-way channel. In this case, just one random generator PHRG is used and station A sends to station B bits ciphered just by half of the initially shared secret bits. B will utilize these bits to read the subsequent sequence sent by A. The logical process and the protection level are the same for both cases of two-way or one-way channels.

The security achieved depends on <n> and M that have to be specified as shown in the following and detailed in "Fast and secure key distribution using mesoscopic coherent states of light", G. A. Barbosa, Phys. Rev. A 68, 052307 (2003); arXiv:quant-ph/0212033 (2002). In particular, the block ciphering utilized imposes a constraint between <n> and M and it is a characteristic of this key distribution scheme with no parallel in the data encryption schemes protocols also based on M-ry bases.

Bit Encoding and the Physical Protecting Mechanism

As a preferred embodiment it is considered phase modulation of signals, where two pulses—for simplicity (or more pulses in principle)—delayed by a fixed amount of time are created with a phase difference $\phi_b$ between them to represent bits 0 or 1 (e.g., $\phi_b$=0 and π). An extra phase difference $\phi_v$ is added to $\phi_b$ provided by K$_M$ shared bits. Several alternate and trivial variations are possible and included in this scheme as, for example, the Differential Phase-Shirt-Keying modulation (DPSK) where two consecutive modulations define the bit value.

A ciphered bit in a simple two-mode quantum state results $$|\Psi_{bv}\rangle = |e^{-i(\phi_b+\phi_v)/2}\alpha/\sqrt{2}\rangle_1 \otimes |e^{i(\phi_b+\phi_v)/2}\alpha/\sqrt{2}\rangle_2$$

where $\phi_b$(=0,π) specifies the bit being "sent", $\phi_v$ is the ciphering phase and α is the coherent state field amplitude. Phase renormalizations can be done where one of the states can be considered as the zero reference and the phase is assigned to the other state.

In a DPSK modulation the composite state defining each bit can be written $$|\Psi_{b1,b2,v1,v2}\rangle = |e^{-i(\phi_{b1}+\phi_{v1})/2}\alpha/\sqrt{2}\rangle_1 \otimes |e^{i(\phi_{b2}+\phi_{v2})/2}\alpha/\sqrt{2}\rangle_2$$

and the bit is defined by the difference |$\phi_{b1}$−$\phi_{b2}$|=0 or π, generating bits 0 or 1. Indexes 1 and 2 refer to two consecutive modulations. The analyses are parallel in all cases. For DPSK modulation two consecutive states produce interferences when superposed. This implies that the two consecutive modulations occur within one laser coherence time.

Figure 4:
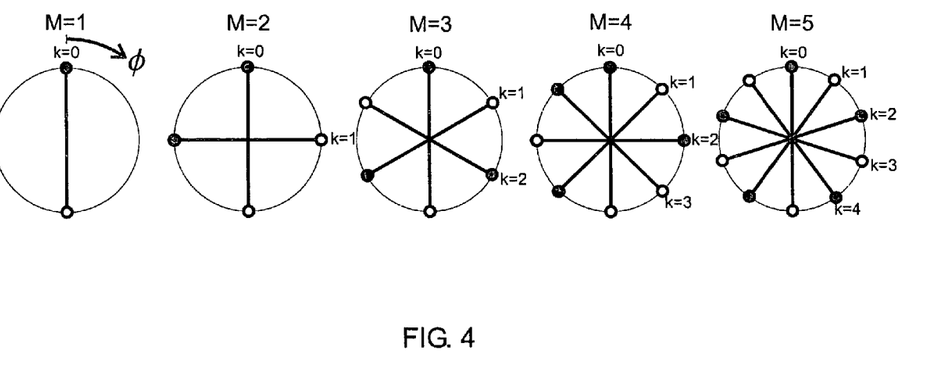
FIG. 4 is a diagram illustrating ciphering wheels for polarization angles on a Poincaré sphere or phase modulation angles.
Figure 5:
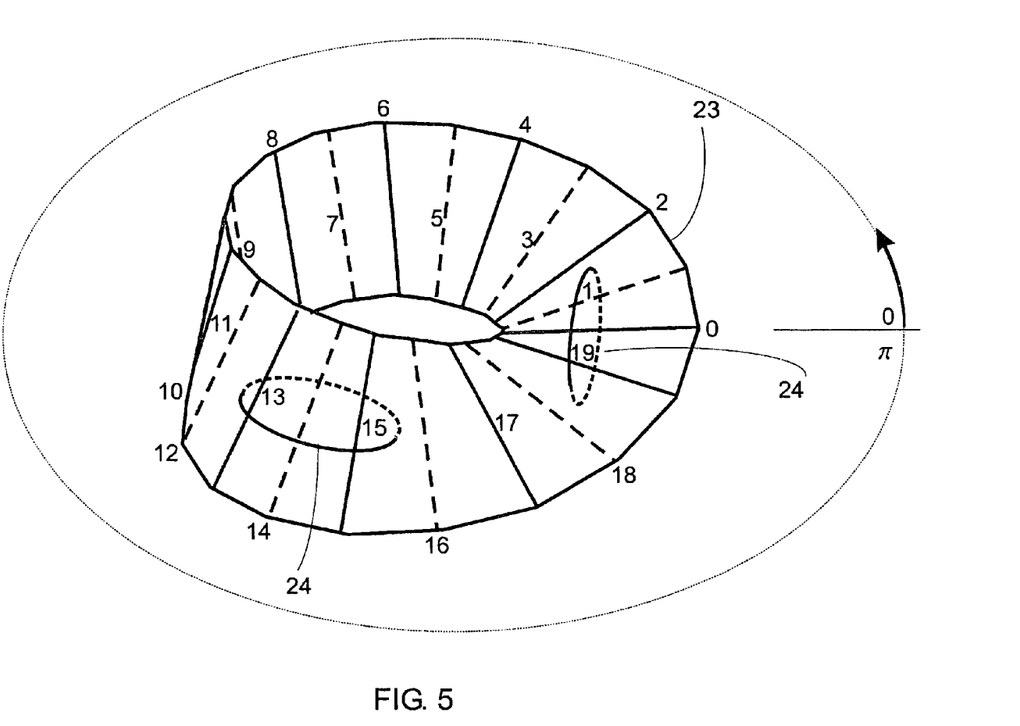
FIG. 5 is a diagram illustrating a Möebius strip representation of a ciphering wheel such as depicted in FIG. 4.
Figure 6:
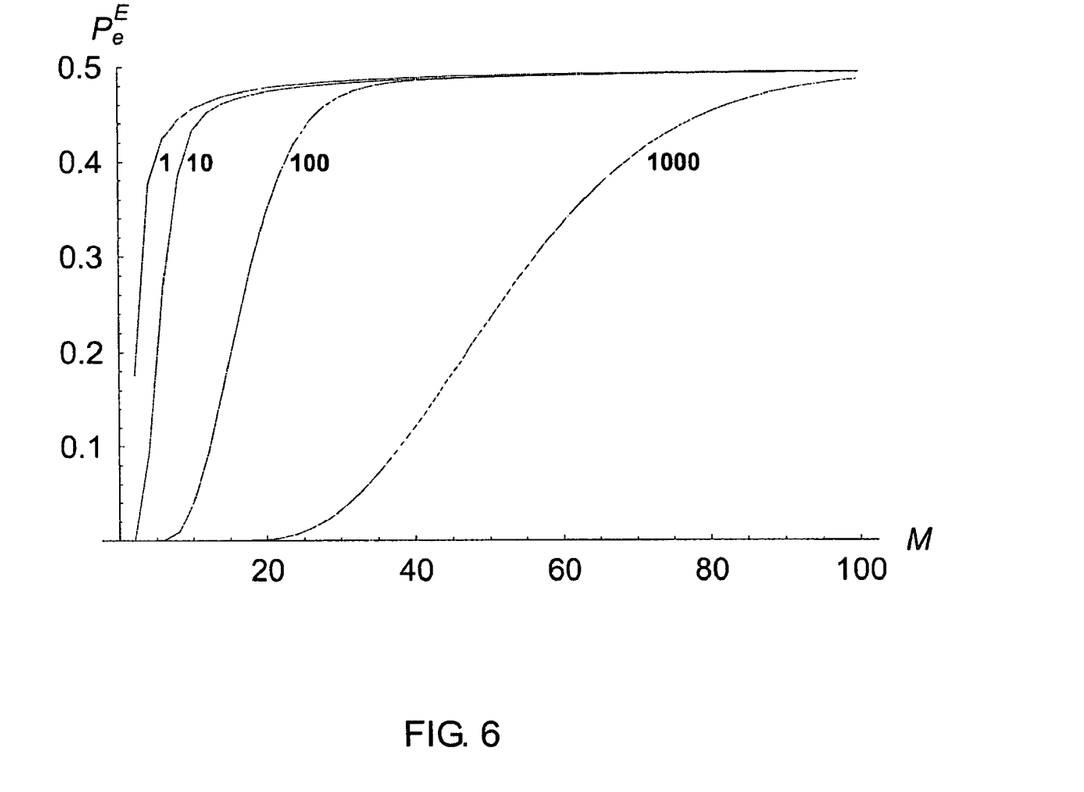
FIG. 6 is a graph $P_e^E$ as a function of M.

Quantum Information theory establishes that the information content is described by the density matrix ρ for all possible states resulting from ciphering a bit b is written as $$\rho_b = \frac{1}{L}\int_0^L P_{\phi_v} |\Psi_{bv}\rangle\langle\Psi_{bv}| dv,$$

where L is the space spanned by v and P$_{\phi_v}$ describes a general phase distribution. L can be a discrete or continuous space and can include a dynamic process at each base as well. As a preferable embodiment for this distribution L is taken as a discrete space of points with v=k where k is one basis in a ciphering wheel as described in FIGS. 4 and 5 and represented by $$\phi_k = \pi\left[\frac{k}{M} + \frac{1-(-1)^k}{2}\right], k = 0, 1, \ldots, M-1.$$

with a-priori probability distributions for even or odd k, given M, equal to $$p_{even-k}(M) = \frac{1-(-1)^M + 2M}{4M},$$

$$p_{odd-k}(M) = \frac{-1+(-1)^M + 2M}{4M}.$$

Each basis represents two orthogonal states or, in general, a combination of states. States in different bases are non-orthogonal among themselves. FIG. 4 shows that for M even, solid points may occur adjacent to each other but not for M odd. These differences produce the different occurrences shown in p$_{even-k}$(M) and p$_{odd-k}$(M).

FIG. 5 also exemplifies a Möebius strip with M=20 where bases or adjacent lines 19 and 20 are on the same side. This do not occur for M=odd. In a DPSK modulation, where two consecutive modulations are given by $\phi_{b_1}$ and $\phi_{b_2}$, any of the bases lines could be used for each ciphering modulation, $\phi_k$ and $\phi_{k'}$. The modulation basis in this case could be understood as a basis constituted by two lines, for example. These examples do not exhaust the possibilities included in $\rho_b$.

Although the notation "M-ry" has been used in the literature to designate either the number of bases used or the number of states (=2×number of bases), here M designates the number of bases. A reason for this is that the number of states attached to each basis can, in fact, be modified at will and may involve, in general, even more than the two states presented in this embodiment.

For a ciphering wheel with two states in a basis, the overlap of |$\Psi_{bv}$⟩ and |$\Psi_{b_1v}$⟩ gives the number of bases covered by the quantum noise of light N$_\sigma$ within σ or N$_\sigma$=Mσ/π=M|(π√<n>). At the receiver, these pulses can be made to interfere and by subtracting the phase $\phi_{90}$, B can recover each random bit sent.

The overall security of the system arises from the combination of the quantum noise and the starting secret key. Both contribute to the exponential search difficulty in a brute force attack looking for the starting secret key K$_0$.

The number of photons <n> per bit to be used is given numerically by the bit-error $$ber = P_e^E = \frac{1}{2}\left(1 - 2\sum_j \lambda_j\right),$$

(see "Fast and secure key distribution using mesoscopic coherent states of light", G. A. Barbosa, Phys. Rev. A 68, 052307 (2003); arXiv:quant-ph/0212033 (2002)) where $\lambda_j$ are the positive eigenvalues from the matrix $\Delta\rho$ where (q, q') elements are $$\Delta\rho_{q,q'} = -2ie^{-2|\alpha|^2}\sqrt{I_{2|q|}(2|\alpha|^2)I_{2|q'|}(2|\alpha|^2)} \times$$

$$\sin[(q'-q)\pi/2]e^{i(q'-q)\pi/2}\frac{1}{M}\sum_{k=0}^{M-1}e^{id_k(q'-q)},$$

where $I_j$ is the Modified Bessel function and $P_e^E$ is the minimum probability of error for an eavesdropper in a bit-by-bit determination. For M=even, $\Delta\rho_{q,q'}$ can be written $$\Delta\rho_{q,q'} = e^{-|\alpha|^2}\sqrt{I_{2|q|}(2|\alpha|^2)I_{2|q'|}(2|\alpha|^2)}$$

$$\left[\frac{1-(-1)^{q'-q}}{2}\right]^2\frac{1-x^M}{M}\left[\frac{1+x^M}{1-x} + \frac{1-x^M}{1+x}\right],$$

where $$x = e^{i\pi\frac{q'-q}{M}}.$$

Several other expansions can be used for $\Delta\rho$ as well as numerical approximations. The chosen expansion above uses angular momentum operators to produce angular rotations in a SU(2) space.

Particular choices of bases states in $\rho_b$ produce distinct calculations but trivial in principle despite eventual numerical difficulties associated with them.

The dependence of ber can be calculated as a function of <n> and M for arbitrary numbers. Therefore, the system can be designed to a desired security level given by $P_e^E$ through the correct choice of <n> and M. As a numerical example consider, say, M=32 (or $K_M$=5 bits) with <n>=100 to achieve $P_e^E$=0.476 in a single pulse (see FIG. 3).

As a block ciphering is used, a given bit is used r-times to cipher distinct bits generated in the random process. The protocol utilized increases the number M of levels utilized to avoid the eavesdropper improves his resolution over the signal sent. An upper limit for protection is set by r=2×$K_M$. (See, "Fast and secure key distribution using mesoscopic coherent states of light", G. A. Barbosa, Phys. Rev. A 68, 052307 (2003); arXiv:quant-ph/0212033 (2002)). In other words, a single shot using r-times the laser power will give the same signal resolution for a bit reading as the r-repeated sequence with <n>. Consequently, for a fixed M, the r-repetition of the random sequence then reduces $P_e^E$ from $P_e^E$(<n>) to $P_e^E$(r<n>). The dependence of $P_e^E$ can be calculated as a function of <n> and M for arbitrary numbers. Therefore, the system can be designed to a desired security level $P_e^E$, through the correct choice of <n> and M. Therefore, to guarantee the same security level ($P_e^E$=0.476), due to the r=2×$K_M$=10 repetitions, one should use M=90 ($K_M$≈7) corresponding to <n>=10 ×100=1000. The conclusion is general regardless of the specific numerical example. Proper scaling can be done for other intensity levels adequate for the sensitivity of the detection system. Note that to achieve the same secure level ber, M increases with <n>.

In order to further increase the diffusion of the random information being transmitted, the random bits that define a single ciphering basis for a block of bits to be sent could be used to start a Linear Feedback-Shift-Register to produce sequences of pseudo-random bits. Each of these pseudo-random sequences of bits would be utilized as a distinct basis to cipher each of the random bits to be sent.

In practical terms, an increased number of levels demands an increased number of bits to provide the necessary resolution and a wider dynamic range for the waveform generators to provide such modulations at high speeds. The 2$K_M$ (over-estimated) repetition decreases the bit output rate from, say, 10 GHz, to 10 GHz/2$K_M$. For example, for a nonrepeated cipher, if one uses M=1000($K_M$≈10), and <n>=$10^4$ the number of levels covered $N_o$=M/($\pi\sqrt{<n>}$)≈3.18. To keep the same number of levels $N_o$ covered under the 2>$K_M$ repetition, equivalent to a single shot with the intensity 2×$K_M$ higher, the number of levels necessary is M≈4472. This reduces the speed to 10 GHz/2×$K_{M_{new}}$=0.4 GHz from 10 GHz.

The robustness of the signals under signal jamming by an enemy, for example, may be of interest for some applications. In this case, one could superpose on the ciphering levels phase and amplitude modulations and even utilize emission at distinct wavelengths to provide a set of conditions that the legitimate parties could use to extract the signals. These are technical variations included in $\rho_b$ as well.

Signal Amplification

Amplification processes always degrade signal resolution for the eavesdropper and stations A or B. The system protection is set at the source in such a way to force an eavesdropper to a maximum number of errors. The amplification process cannot improve her bit-error-rate. On the contrary, the knowledge of the key allows station B to distinguish signals as long as he has a good signal-to-noise ratio. Therefore, amplification is possible for the legitimate receivers because they need a smaller resolution degree than an eavesdropper and it works as long as stations A and B can identify signals in orthogonal bases. This also defines the distance range where the system is secure. Another parameter that defines the amplification distance is the ratio $P_B^e$(z=L)/$P_E^e$(z=0), where z is the distance where station B or the eavesdropper are at. This parameter has to give an advantage for stations B over the eavesdropper. When this advantage fails this defines the maximum distance where the system works.

Stations A and B can utilize amplifiers up to distances of ≈500 km before optical-electric-optical signal regeneration becomes necessary. Spontaneous decay from amplifiers contribute to extra noises in the mode to be amplified as well as onto modes orthogonal to the carrier. These added noise sources degrade signal resolution for the users and increase the bit error rate. This is another fundamental process that define the maximum distance to be achieved in an optical channel before regeneration becomes necessary. Other error sources exist such as acoustic and thermal fluctuations but they occur in a much slower time scale and are not relevant for this description because they can be technically corrected.

In summary, the cryptographic optical system of the present invention includes (a) one or more emitter units, each including a coherent light source and the physical means to modulate the mesoscopic light output of said source to one or more among M states of polarization or phases of light dictated by the output of physical random generators and a starting distinct secret sequence of random bits shared by each pair of communicating units; (b) a means to control the output intensity of said light sources to the desired state of polarization or phase depending on the value chosen for M and vice-versa such that an eavesdropper with access to the full sequence of signals will not be able to extract the bit information from the emitted sequences; (c) one or more receiver units of the emitted signals each including a physical means to demodulate the received optical signals of a given emitter to two distinct optical or electronic outputs representing the random bits emitted; (d) a one-way or two-way quantum optical channel for transmitting said signals between any emitter and any receiver; (e) a public two-way channel for exchange of messages between any emitter and any receiver unit; (f) light sources such as lasers where emitted signals can be pulsed, continuous, quasi-monochromatic or consisting of a combination of wavelengths; and (g) operation means of communicating either in time or frequency domains in private quantum channels or by simultaneous sharing classical optical communication channels by frequency multiplexing or in distinct time slots. The invention further relates to a generic protocol that specifies the operational procedure to be followed by said cryptographic optical system, by controlling each emitting and receiving unit, the communication in the quantum optical channel and in the public channel, the physical random generators and any number of computers or integrated circuitry necessary to operate said system wherein the protocol defines the operational steps in dealing with the random bit sequence generated including the bit sequence length, the block size to be ciphered depending on the M value and the light amplitude used. The protocol also defines the basic operational steps of dealing with the random bit sequence received including the bit sequence length and block size being ciphered and defines fundamental parameters to be used such as light intensity in a bit and a number of bases to be used. The protocol also controls the public information exchange between each pair of emitting and receiving units to achieve information reconciliation and privacy amplification for classical error corrections in the transmission or at the receiver units such that a final sequence of identical and secure random bits can be shared between each pair of communicating units. Further, the physical random generator (PhRG) to be used in the cryptographic optical system may include a shot-noise limited laser, a shot-noise limited detector, sampling and averaging circuitries producing sign signals that are converted to two distinct voltage signals $V_R$ according to the sign signal received wherein said voltage signals are the random bits generated by the PhRG.

Many modifications and variations of the present invention are possible in light of the above teachings. Thus, it is to be understood that the invention may be practiced otherwise than as described hereinabove.

The invention claimed is:

1. A cryptographic system for key distribution comprising:
   at least one emitter unit comprising:
   a source that provides a signal;
   a physical random generator that provides a sequence of random bits; and
   a modulator that modulates the signal from the source in accordance with the sequence of random bits from the physical random generator and a starting secret key that is shared with a receiver unit to provide a ciphered signal that is transmitted from the emitter unit to the receiver unit, wherein the modulator modifies the signal from the source into elliptically polarized light states; and
   at least one receiver unit that receives the ciphered signal, the receiver unit comprising:
   a demodulator that demodulates a received ciphered signal in accordance with the shared starting secret key to provide outputs representing the sequence of random bits, wherein the receiver unit utilizes the sequence of random bits obtained from the received ciphered signal as a next cipher key to be used.

2. A cryptographic system for key distribution as recited in claim 1 wherein the signal, provided by the source, is coherent light signal and the modulator is an optical modulator.

3. A cryptographic system for key distribution as recited in claim 2 wherein the demodulator includes a polarization beam splitter.

4. A cryptographic system for key distribution as recited in claim 2 wherein the demodulator includes a phase detection system.

5. A cryptographic system for key distribution comprising:
   at least one emitter unit comprising:
   a source that provides a signal in a form of a coherent light signal;
   a physical random generator that provides a sequence of random bits wherein the physical random generator includes a shot-noise limited laser, a shot-noise limited detector, sampling and averaging circuits providing plus sign or minus sign signals based on an average pulse voltage and an electronic circuit that converts the plus sign or minus sign signals to first and second voltages wherein the voltages represent the random bits generated by the physical random generator; and
   an optical modulator that modulates the signal from the source in accordance with the sequence of random bits from the physical random generator and a starting secret key that is shared with a receiver unit to provide a ciphered signal that is transmitted from the emitter unit to the receiver unit, wherein the optical modulator modifies the signal from the source into elliptically polarized light states; and
   at least one receiver unit that receives the ciphered signal, the receiver unit comprising:
   a demodulator that demodulates a received ciphered signal in accordance with the shared starting secret key to provide outputs representing the sequence of random bits.

6. A cryptographic system for key distribution as recited in claim 5, wherein the sequence of random bits is ciphered in block sizes of $K_M$ where $K_M = \log_2 M$, and wherein the transmitted sequence has a bit length of $L_o$ and a number of ciphered blocks is $L_o/K_M$.

7. A cryptographic optic system for key distribution comprising:
   at least one emitter unit comprising:
   a source that provides coherent light;
   a physical random generator that provides a sequence of random bits; and
   an optical modulator that modulates the light from the source to M states of polarization in accordance with the sequence of random bits from the physical random generator and a starting secret key that is shared with a receiver unit to provide a ciphered sequence of random bits that is transmitted from the emitter unit to the receiver unit, wherein the optical modulator modifies the light from the source into elliptically polarized light states; and at least one receiver unit that receives the ciphered sequence of random bits, the receiver unit comprising:
a demodulator having a polarization beam splitter, the demodulator demodulating the received ciphered sequence of random bits in accordance with the shared starting secret key to provide a random sequence of orthogonally polarized light states representing the sequence of random bits wherein the random sequence of orthogonally polarized light states obtained from the received ciphered sequence of random bits provides a next cipher key to be used.

8. A cryptographic system for key distribution comprising:
at least one emitter unit comprising:
a source that provides coherent light;
a physical random generator that provides a sequence of random bits, wherein the physical random generator includes a shot-noise limited laser, a shot-noise limited detector, sampling and averaging circuits providing plus sign or minus sign signals based on an average pulse voltage and an electronic circuit that converts the plus sign or minus sign signals to first and second voltages, wherein the voltages represent the random bits generated by the physical random generator; and
an optical modulator that modulates the light from the source to M states of polarization in accordance with the sequence of random bits from the physical random generator and a starting secret key that is shared with a receiver unit to provide a ciphered sequence of random bits that is transmitted from the emitter unit to the receiver unit, wherein the optical modulator modifies the light from the source into elliptically polarized light states; and at least one receiver unit that receives the ciphered sequence of random bits, the receiver unit comprising:
a demodulator having a polarization beam splitter, the demodulator demodulating the received ciphered sequence of random bits in accordance with the shared starting secret key to provide a random sequence of orthogonally polarized light states representing the sequence of random bits.

9. A cryptographic optical system for key distribution comprising:
at least one emitter unit comprising:
a source that provides coherent light;
a physical random generator that provides a sequence of random bits that is ciphered in block sizes of $K_M$ where $K_M = \log_2 M$; and
an optical modulator that modulates the light from the source to M states of polarization in accordance with the sequence of random bits from the physical random generator and a starting secret key that is shared with a receiver unit to provide a ciphered sequence of random bits that is transmitted from the emitter unit to the receiver unit, wherein the transmitted ciphered sequence has a bit length of $L_o$ and a number of ciphered blocks is $L_o/K_M$; and at least one receiver unit that receives the ciphered sequence of random bits, the receiver unit comprising:
a demodulator having a polarization beam splitter, the demodulator demodulating the received ciphered sequence of random bits in accordance with the shared starting secret key to provide a random sequence of orthogonally polarized light states representing the sequence of random bits wherein the random sequence of orthogonally polarized light states obtained from the received ciphered sequence of random bits provides a next cipher key to be used.

10. A cryptographic optical system for key distribution as recited in claim 9 wherein the wherein the optical modulator modifies the light from the source into elliptically polarized light states.

11. A cryptographic optical system for key distribution comprising:
at least one emitter unit comprising:
a source that provides coherent light;
a physical random generator that provides a sequence of random bits; and
an optical modulator that modulates the light from the source to M states of light phases in accordance with the sequence of random bits from the physical random generator and a starting secret key that is shared with a receiver unit to provide a ciphered sequence of random bits that is transmitted from the emitter unit to the receiver unit, wherein the sequence of random bits is ciphered in block sizes of $K_M$ where $K_M = \log_2 M$, wherein the transmitted sequence has a bit length of $L_o$ and a number of ciphered blocks is $L_o/K_M$; and at least one receiver unit that receives the ciphered sequence of random bits, the receiver unit comprising:
a demodulator having a phase detection system, the demodulator demodulating the received ciphered sequence of random bits in accordance with the shared starting secret key to provide two distinct optical outputs representing the sequence of random bits.

12. A cryptographic optical system for key distribution as recited in claim 11 wherein the random sequence of orthogonally polarized light states obtained from the received ciphered sequence of random bits provides the next cipher key to be used instead of the starting secret key.

13. A cryptographic system for key distribution as recited in claim 11 wherein the physical random generator includes a shot-noise limited laser, a shot-noise limited detector, sampling and averaging circuits providing plus sign or minus sign signals based on an average pulse voltage and an electronic circuit that converts the plus sign or minus sign signals to first and second voltages wherein the voltages represent random bits generated by the physical random generator.

14. A cryptographic optical system for key distribution as recited in claim 11 wherein the optical modulator modifies the light from the source into elliptically polarized light states.

15. A cryptographic system for key distribution as recited in claim 1, wherein the sequence of random bits is ciphered in block sizes of $K_M$ where $K_M = \log_2 M$, and wherein the transmitted sequence has a bit length of $L_o$ and a number of ciphered blocks is $L_o/K_M$.

16. A method of key distribution for use in a cryptographic system comprising:
providing a signal;
providing a sequence of random bits;
modulating the signal in accordance with the sequence of random bits and a starting secret key to provide a ciphered sequence of random bits, wherein the sequence of random bits is ciphered in block sizes of $K_M$ where $K_M = \log_2 M$;
transmitting the ciphered sequence of random bits to a receiver unit, wherein the transmitted sequence has a bit length of $L_o$ and a number of ciphered blocks is $L_o/K_M$;
receiving the transmitted ciphered sequence of random bits at the receiver unit;

demodulating the received ciphered signal in accordance with the starting secret key to provide outputs representing the sequence of random bits; and using the sequence of random bits obtained from the received ciphered signal as a next cipher key to be used.

17. A method of key distribution as recited in claim 16 wherein the signal provided is a coherent light signal.

18. A method of key distribution as recited in claim 17 wherein the light signal is modulated to M states of polarization and wherein a modulator modifies the signal into elliptically polarized light states.

19. A method of key distribution as recited in claim 16 wherein the light is modulated to M states of light phases.

* * * * *